United States Patent
Nada (10) Patent No.: US 9,802,506 B2
(45) Date of Patent: Oct. 31, 2017

(54) FUEL CELL SYSTEM

(71) Applicant: TOYOTA JIDOSHA KABUSHIKI KAISHA, Toyota-shi, Aichi-ken (JP)

(72) Inventor: Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/095,339

(22) Filed: Apr. 11, 2016

(65) Prior Publication Data

US 2016/0311340 A1 Oct. 27, 2016

(30) Foreign Application Priority Data

Apr. 22, 2015 (JP) ................................. 2015-087453

(51) Int. Cl.
*B60L 11/18* (2006.01)
*H01M 8/04* (2016.01)
*B60W 50/14* (2012.01)
*H01M 8/04082* (2016.01)
*H01M 8/04089* (2016.01)

(52) U.S. Cl.
CPC .......... *B60L 11/1881* (2013.01); *B60W 50/14* (2013.01); *H01M 8/04089* (2013.01); *H01M 8/04201* (2013.01); *H01M 2250/20* (2013.01); *Y02T 90/32* (2013.01)

(58) Field of Classification Search
CPC ............ B60L 11/00–11/1898; H01M 8/04201; H01M 8/04089; H01M 2250/20; B60W 50/14
See application file for complete search history.

(56) References Cited

U.S. PATENT DOCUMENTS

| | | | |
|---|---|---|---|
| 2003/0134167 A1* | 7/2003 | Hirakata | ................... B60K 1/04 429/432 |
| 2004/0094230 A1* | 5/2004 | Ono | .......................... F17C 6/00 141/286 |
| 2008/0118797 A1* | 5/2008 | Hirakata | ............. B60L 11/1816 429/430 |

(Continued)

FOREIGN PATENT DOCUMENTS

| | | |
|---|---|---|
| DE | 10350456 A1 | 6/2004 |
| DE | 102007005359 A1 | 8/2008 |

(Continued)

*Primary Examiner* — Courtney Heinle
(74) *Attorney, Agent, or Firm* — Finnegan, Henderson, Farabow, Garrett & Dunner, LLP (57) ABSTRACT

A fuel cell system mounted on a vehicle, includes: a tank that stores a reactive gas which is to be supplied to a fuel cell; a filling port that fills the reactive gas into the tank and is connected with a supply tube that supplies the reactive gas; a lid that closes the filling port; an open-close sensor that detects open/closed position of the lid; a recorder unit that records a travel history which indicates the fact that the vehicle moves; and a controller unit that controls the vehicle. Upon satisfaction of conditions that the vehicle is in a drivable state, that the recorder unit has no travel history since activation of the fuel cell system and that the open/closed position of the lid detected by the open-close sensor indicates an open position, the controller unit sets the vehicle to a non-drivable state.

3 Claims, 4 Drawing Sheets (56) References Cited

U.S. PATENT DOCUMENTS

| | | | |
|---|---|---|---|
| 2008/0185912 A1* | 8/2008 | Tighe | B60L 11/1881 307/10.1 |
| 2014/0012444 A1* | 1/2014 | Wake | B60L 11/1881 701/22 |
| 2014/0277880 A1* | 9/2014 | Takaku | B60L 11/1885 701/22 |
| 2015/0183336 A1* | 7/2015 | Kim | B60L 11/1885 701/22 |
| 2016/0137194 A1* | 5/2016 | Kajiwara | B60W 20/50 701/22 |

FOREIGN PATENT DOCUMENTS

| | | |
|---|---|---|
| DE | 102010008206 A1 | 8/2011 |
| JP | 2004-148980 | 5/2004 |
| JP | 2011-156896 | 8/2011 |
| JP | 2011-250641 A | 12/2011 |
| JP | 2014-014207 A | 1/2014 |
| WO | WO 2011/092561 A1 | 8/2011 |

\* cited by examiner

Fig.4

FUEL CELL SYSTEM

CROSS REFERENCE TO RELATED APPLICATION

This application claims priority based on Japanese Patent Application No. 2015-087453, filed on Apr. 22, 2015, the contents of all of which are incorporated herein by reference in their entirety.

BACKGROUND OF INVENTION

Field

The present invention relates to a fuel cell system.

Related Art

A proposed configuration of a fuel cell system mounted on a vehicle includes a reservoir provided to store a reactive gas used for power generation of a fuel cell. A filling port configured to fill the reactive gas into the reservoir is provided with a cover portion that is arranged to cover a connecting portion configured to connect a supply portion provided to supply the reactive gas with the filling port. In the process of filling the reactive gas, the cover portion is opened, the supply portion is connected to the connecting portion, and the reactive gas is filled from the supply portion via the filling port into the reservoir.

JP 2011-156896A describes a vehicle configured such that a supply portion is connected to a filling port and a reactive gas is filled from the supply portion via the filling port. This vehicle is likely to damage the filling port and the supply portion when the vehicle starts in the state that the supply portion is kept connected to the filling port. In order to prevent this likelihood, one possible configuration may set the vehicle to a non-drivable state in the case where the cover portion is in open position in the drivable state of the vehicle. This configuration, however, causes the following problem. In the case of an erroneous determination that the cover portion is in the open position, for example, due to a failure of an open-close sensor provided to detect the open/closed position of the cover portion in the driving state of the vehicle (this is included in the drivable state of the vehicle), this configuration makes the vehicle non-drivable, despite no real trouble in driving of the vehicle. There is accordingly a need for a technique that distinguishes the situation of filling the reactive gas from the other situations and achieves the control for the purpose of protecting the filling port and the supply portion from being damaged.

SUMMARY OF THE INVENTION

In order to solve at least part of the above problems, the invention may be implemented by any of the following aspects.

(1) According to one aspect of the invention, there is provided a fuel cell system mounted on a vehicle. The fuel cell system comprises a reservoir that is configured to store a reactive gas which is to be supplied to a fuel cell; a connecting portion that is configured to connect a supply portion for supplying the reactive gas with a filling port for filling the reactive gas into the reservoir; a cover portion that is configured to cover the connecting portion; an open-close sensor that is configured to detect open/closed position of the cover portion; a recorder that is configured to record a travel history which indicates the fact that the vehicle moves; and a controller that is configured to control the vehicle. Upon satisfaction of conditions that the vehicle is in a drivable state, that the recorder has no travel history since activation of the fuel cell system and that the open/closed position of the cover portion detected by the open-close sensor indicates an open position, the controller sets the vehicle to a non-drivable state. The fuel cell system of this aspect performs the control to set the vehicle to the non-drivable state on the premise that the vehicle is in the drivable state, that the recorder has no travel history since activation of the fuel cell system and that the cover portion is in the open position. On the conditions that the vehicle is in the drivable state, that the recorder has no travel history since activation of the fuel cell system and that the cover portion arranged to cover the filling port is open, it is highly probable that the vehicle starts in the state that the filling port is kept connected to the supply portion. Setting the vehicle to the non-drivable state on these premises distinguishes the situation of filling the reactive gas from the other situations and achieves the control of making the vehicle non-drivable for the purpose of protecting the filling port and the supply portion from being damaged. Even in the case of an erroneous determination that the cover portion is in the open position due to a failure of the open-close sensor in the driving state of the vehicle (this is included in the drivable state of the vehicle), this configuration does not set the vehicle to the non-drivable state because the recorder has travel history. This accordingly does not interfere with driving of the vehicle.

(2) In the fuel cell system of the above aspect, a state that an accelerator operation for accelerating the vehicle is accelerator off operation and that the vehicle moves only at a speed of not higher than a predetermined speed for a time period of not longer than a predetermined time since activation of the fuel cell system may be specified as a state that the recorder has no travel history. In the case where the vehicle is in the drivable state, where the open/closed position of the cover portion detected by the open-close sensor indicates the open position and where the vehicle is moved by "creeping" after activation of the fuel cell system, the fuel cell system of this aspect sets the vehicle to the non-drivable state.

(3) The fuel cell system of the above aspect may further comprise a notifier that is configured to notify a driver of the vehicle of the cover portion being in the open position when setting the vehicle to the non-drivable state upon satisfaction of the conditions. The fuel cell system of this aspect enables the driver of the vehicle equipped with the fuel cell system to be notified of the cover portion being in the open position. This alerts the driver who is going to start the vehicle in the state that the filling port is kept connected to the supply portion, to disconnect the supply portion from the filling port and close the cover portion. This also alerts the driver who is going to start the vehicle in the state that the supply portion is disconnected from the filling port but the cover portion is kept open, to close the cover portion.

The invention is not limited to the aspects of the fuel cell system mounted on the vehicle but is applicable to various other aspects, for example, a fuel cell system that is mounted on, a ship using electric power as the power source, a vehicle itself or a ship itself and computer programs that implement the foregoing. The invention is not limited to the aspects described above but may be implemented by various other aspects within the scope of the invention.

DESCRIPTION OF THE EMBODIMENTS

A. First Embodiment

Figure 1:
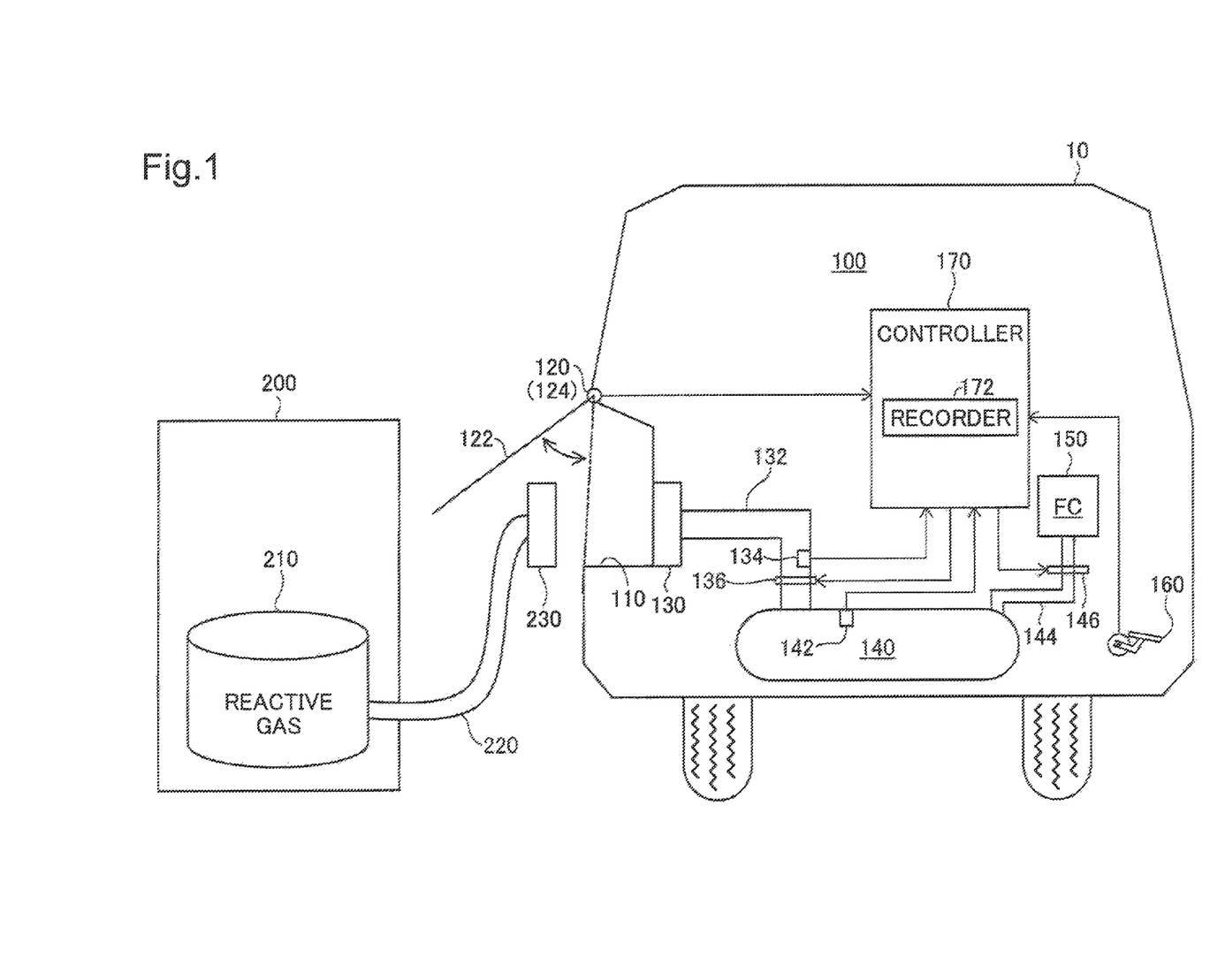
FIG. 1 is a diagram illustrating the configuration of a vehicle equipped with a fuel cell system and a reactive gas station.

FIG. 1 is a diagram illustrating the configuration of a vehicle 10 equipped with a fuel cell system 100 according to an embodiment and a reactive gas station 200 to supply a reactive gas to the vehicle 10. The vehicle 10 runs with electric power generated by the fuel cell system 100. According to this embodiment, the vehicle 10 is a fuel cell vehicle. According to this embodiment, the vehicle 10 has a recessed portion 110 that is recessed from a sidle face of the body of the vehicle 10.

The reactive gas station 200 is configured to supply the reactive gas to a tank 140 included in the vehicle 10. According to this embodiment, the reactive gas is hydrogen. The reactive gas station 200 includes a tank 210, a supply tube 220 and a nozzle 230. The tank 210 is a tank configured to store the reactive gas. The supply tube 220 has one end connected with the tank 210 and the other end connecting with a nozzle 230 to form a flow path which the reactive gas flows through from the tank 210 to the nozzle 230. The nozzle 230 is configured to be connectable with a filling port 130.

The fuel cell system 100 is mounted as the power source on the vehicle 10. The reactive gas station 200 can supply the reactive gas to the vehicle 10 in the stopping the fuel cell system. The fuel cell system 100 includes a hinge portion 120, a cover portion 122, the filling port 130, a filling path 132, a pressure sensor 134, an on-off valve 136, the tank 140, a temperature sensor 142, a supply path 144, a main stop valve 146, a fuel cell 150, an accelerator 160 and a controller 170.

The hinge portion 120 is provided on an upper side in the direction of gravity of the recess 110 of the vehicle 10. The hinge portion 120 couples the vehicle 10 with the cover portion 122 so as to support the cover portion 122 rotatable to the vehicle 10. The cover portion 122 is formed in a shape that covers the opening of the recess 110 and is arranged to open and close the opening of the recess 110. According to this embodiment, the hinge portion 120 is provided with an open-close sensor 124.

The open-close sensor 124 is configured to detect the open/closed position of the cover portion 122, based on the angular position away from the opening of the recess 110. According to this embodiment, the open-close sensor 124 outputs a signal representing the open position to the controller 170 in response to detection of the open position of the cover portion 122, while outputting a signal representing the closed position to the controller 170 in response to detection of the closed position of the cover portion 122.

The filling port 130 is configured to be connectable with the nozzle 230. The filling path 132 is configured to make the filling port 130 communicate with the tank 140 and form a flow path which the reactive gas fed through the filling port 130 connected with the nozzle 230 flows to the tank 140.

The pressure sensor 134 is provided in the filling path 132 to measure the pressure P in the tank 140 filled with the reactive gas.

The on-off valve 136 is provided in the filling path 132. The on-off valve 136 is opened in the case of filling the reactive gas, while being closed in the case of not filling the reactive gas. According to this embodiment, the open-close operation of the on-off valve 136 is controlled by the controller 170.

The tank 140 stores the reactive gas fed through the filling port 130. The temperature sensor 142 is provided in the tank 140 to measure the temperature T in the tank 140 in the course of filling the reactive gas. The supply path 144 is configured to make the tank 140 communicate with the fuel cell 150 and form a flow path which the reactive gas flows through from the tank 140 to the fuel cell 150.

The main stop valve 146 is provided in the supply path 144. The main stop valve 146 is opened in the case of supplying the reactive gas to the fuel cell 150, while being closed in the case of not supplying the reactive gas to the fuel cell 150. According to this embodiment, the open-close operation of the main stop valve 146 is controlled by the controller 170.

The fuel cell 150 is configured to generate electric power by using the reactive gas. According to this embodiment, the fuel cell 150 uses hydrogen as the reactive gas and oxygen supplied through an oxygen supply path (not shown) to the fuel cell 150 to generate electric power.

The accelerator 160 receives a request for accelerating the vehicle 10 from the driver of the vehicle 10. According to this embodiment, the accelerator 160 is provided with a depression amount detection sensor that is configured to detect a depression amount of the accelerator 160 by the driver of the vehicle 10 as the degree of the request from the driver of the vehicle 10. According to this embodiment, the "off state" of the accelerator 160 means the state that the depression amount of the accelerator 160 by the driver of the vehicle 10 is zero.

The controller 170 controls the respective parts of the fuel cell system 100. According to this embodiment, the controller 170 computes the filling state of hydrogen into the tank 140, based on a signal that represents the pressure P and is output from the pressure sensor 134 and a signal that represents the temperature T and is output from the temperature sensor 142. According to this embodiment, the controller 170 computes an amount of electric power required for the fuel cell 150 and a secondary battery (not shown) from the depression amount of the accelerator 160 detected by the depression amount detection sensor. The controller 170 includes a recorder 172.

The recorder 172 records a travel history that indicates driving record of the vehicle 10. According to this embodiment, the recorder 172 records a travel history that indicates driving record of the vehicle 10 but does not record a travel history that indicates non-driving record of the vehicle 10. According to another embodiment, the recorder 172 may record a travel history that indicates driving record of the vehicle 10, as well as a travel history that indicates non-driving record of the vehicle 10.

According to this embodiment, in the case where the vehicle 10 is in the drivable state, where the recorder 172 has no travel history since activation of the fuel cell system 100 and where the open/closed position of the cover portion 122 detected by the open-close sensor 124 indicates the open position, the controller 170 immediately sets the vehicle 10 to the non-drivable state.

According to this embodiment, the "drivable state of the vehicle 10" means the state that the driver of the vehicle 10 is allowed to accelerate the vehicle 10 by depressing the accelerator 160. According to this embodiment, the "non-drivable state of the vehicle 10" means the state that the driver of the vehicle 10 is not allowed to accelerate the vehicle 10 whether the driver depresses the accelerator 160 or not. According to another embodiment, the "drivable state of the vehicle 10" may include the state that the vehicle 10 is movable by "creeping", in addition to the state that the driver of the vehicle 10 is allowed to accelerate the vehicle 10 by depressing the accelerator 160. According to another embodiment, the "non-drivable state of the vehicle 10" may be, for example, the state that wheels are locked by braking, the state that the supply of electric power to a drive motor is cut off or the state that the supply of electric power to an actuator of the vehicle is cut off.

According to this embodiment, "activation of the fuel cell system 100" means that the main stop valve 146 is opened to supply the reactive gas to the fuel cell 150.

According to this embodiment, the recorder 172 does not record the state that the accelerator operation for accelerating the vehicle 10 is accelerator-off operation and that the vehicle 10 moves only at a speed of not higher than 3 km/h for a time period of less than 3 seconds since activation of the fuel cell system 100, as the travel history. This state is supposed as "creeping" of the vehicle 10.

In the case where the vehicle 10 is in the drivable state, where the open/closed position of the cover portion 122 detected by the open-close sensor 124 indicates the open position and where the vehicle 10 is moved by "creeping" after activation of the fuel cell system 100, the vehicle 10 is set to the non-drivable state.

Figure 2:
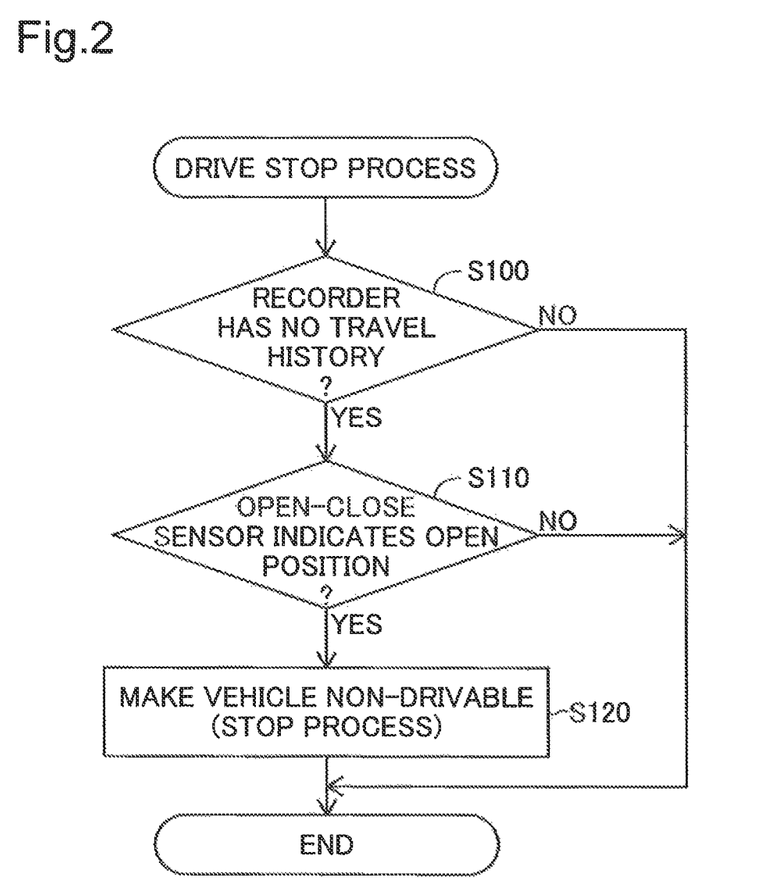
FIG. 2 is a flowchart showing a travel stop process performed by a controller.

FIG. 2 is a flowchart showing a drive stop process performed by the controller 170. According to this embodiment, the controller 170 performs the drive stop process of FIG. 2 when the vehicle 10 is in the drivable state.

On start of the drive stop process of FIG. 2, the controller 170 determines whether the recorder 172 has no travel history since last activation of the fuel cell system 100 (step S100). When the recorder 172 has a travel history since activation of the fuel cell system 100 (step S100: NO), the controller 170 terminates the drive stop process of FIG. 2.

When the recorder 172 has no travel history since activation of the fuel cell system 100 (step S100: YES), the controller 170 subsequently determines whether the open/closed position of the cover portion 122 detected by the open-close sensor 124 indicates the open position (step S110).

When it is determined that the open/closed position of the cover portion 122 detected by the open-close sensor 124 indicates the closed position (step S110: NO), the controller 170 terminates the drive stop process of FIG. 2.

When it is determined that the open/closed position of the cover portion 122 detected by the open-close sensor 124 indicates the open position (step S110: YES), the controller 170 performs a stop process (step S120). In the stop process (at step S120), the controller 170 sets the vehicle 10 to the non-drivable state. The controller 170 then terminates the drive stop process of FIG. 2.

The configuration of the embodiment described above performs the control to set the vehicle 10 to the non-drivable state on the premise that the vehicle 10 is in the drivable state, that the recorder 172 has no travel history since activation of the fuel cell system 100 and that the cover portion 122 is in the open position. On the conditions that the vehicle 10 is in the drivable state, that the recorder 172 has no travel history since activation of the fuel cell system 100 and that the cover portion 122 arranged to cover the filling port 130 is open, it is highly probable that the vehicle 10 starts in the state that the filling port 130 is kept connected to the nozzle 230. Setting the vehicle 10 to the non-drivable state on these premises distinguishes the situation of filling the reactive gas from the other situations and achieves the control of making the vehicle 10 non-drivable for the purpose of protecting the filling port 130 and the nozzle 230 from being damaged. Even in the case of an erroneous determination that the cover portion 122 is in the open position due to a failure of the open-close sensor 124 in the driving state of the vehicle 10 (this is included in the drivable state of the vehicle 10), this configuration does not set the vehicle 10 to the non-drivable state because the recorder has travel history. This accordingly does not interfere with driving of the vehicle 10.

B. Second Embodiment

Figure 3:
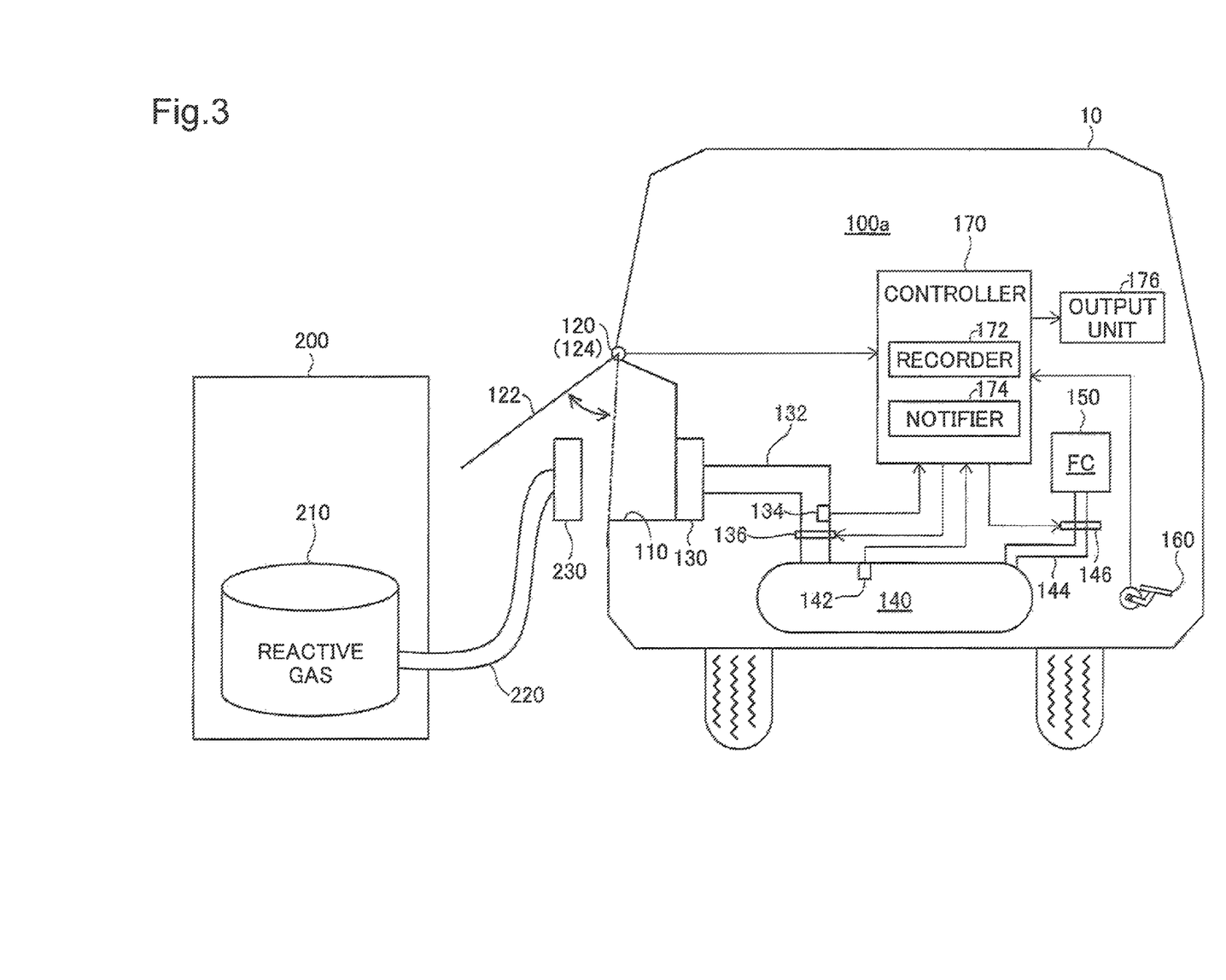
FIG. 3 is a diagram illustrating the configuration of a vehicle equipped with a fuel cell system according to another embodiment.

FIG. 3 is a diagram illustrating the configuration of a vehicle 10 equipped with a fuel cell system 100*a* according to another embodiment and the reactive gas station 200 to supply the reactive gas to the vehicle 10. The fuel cell system 100*a* has a similar configuration to that of the fuel cell system 100 of the above embodiment, except the fuel cell system 100*a* additionally includes a notifier 174 and an output unit 176.

When the controller 170 sets the vehicle 10 to the non-drivable state on the conditions that the vehicle 10 is in the drivable state, that the recorder 172 has no travel history since activation of the fuel cell system 100*a* and that the open-close sensor 124 outputs a signal representing the open position of the cover portion 122 to the controller 170, the notifier 174 of the fuel cell system 100*a* notifies the driver of the vehicle 10 of the cover portion 122 being in the open position. The notifier 174 notifies the driver of the vehicle 10, via the output unit 176, of the cover portion 122 being in the open position. The output unit 176 may be an LED that changes the emission color for notification, a liquid crystalline display that provides a display on the screen for notification, or a buzzer that provides an alarm sound for notification, based on a signal output from the notifier 174.

The configuration of this embodiment enables the driver of the vehicle 10 equipped with the fuel cell system 100*a* to be notified of the cover portion 122 being in the open position. This alerts the driver who is going to start the vehicle 10 in the state that the filling port 130 is kept connected to the nozzle 230, to disconnect the nozzle 230 from the filling port 130 and close the cover portion 122. This also alerts the driver who is going to start the vehicle 10 in the state that the nozzle 230 is disconnected from the filling port 130 but the cover portion 122 is kept open, to close the cover portion 122.

C. Modifications

Figure 4:
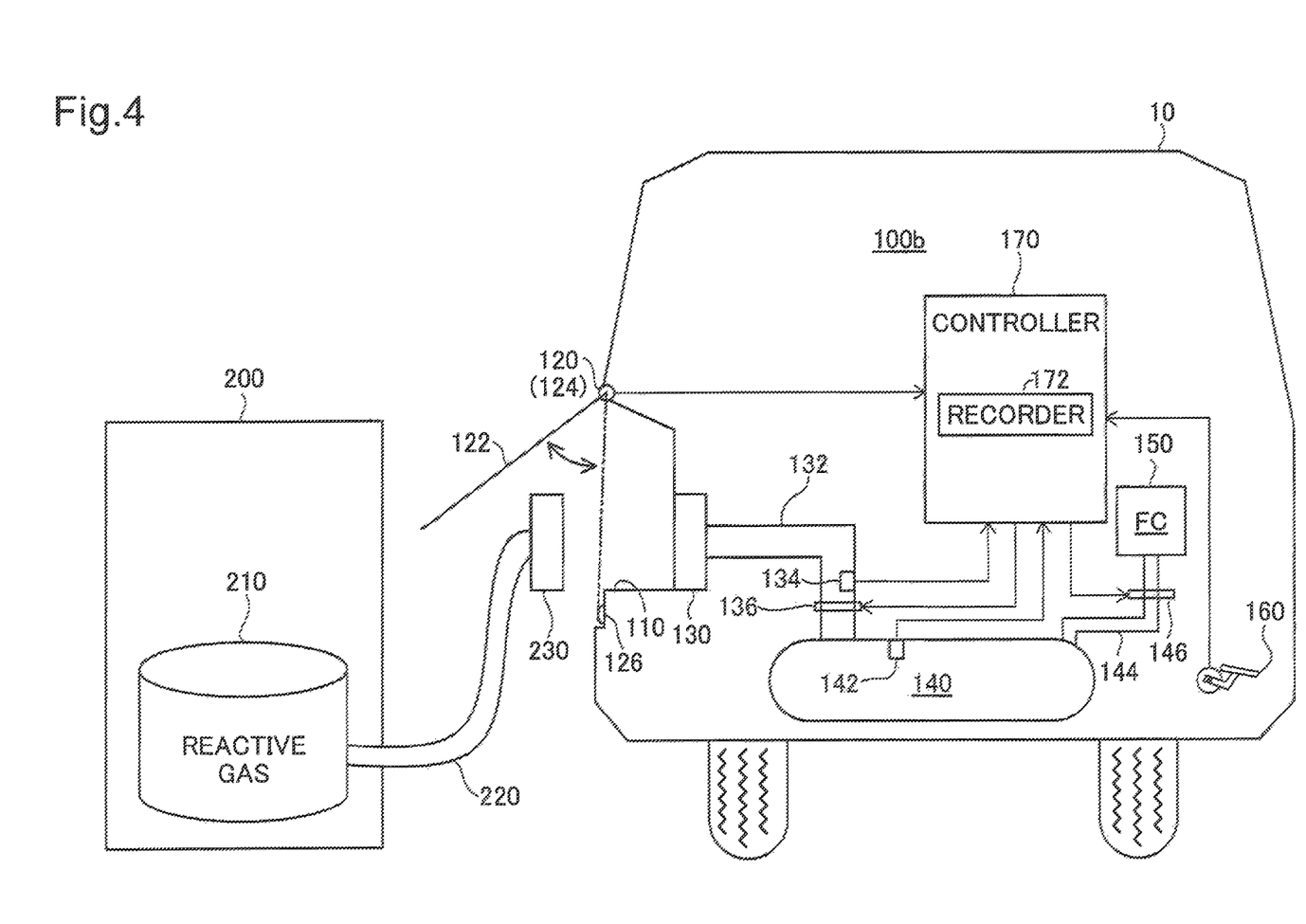
FIG. 4 is a diagram illustrating the configuration of a vehicle equipped with a fuel cell system according to another embodiment.

FIG. 4 is a diagram illustrating the configuration of a vehicle 10 equipped with a fuel cell system 100*b* according to another embodiment. The fuel cell system 100*b* has a similar configuration to that of the fuel cell system 100 of the above embodiment, except that the fuel cell system 100*b* additionally includes an open-close detection switch 126.

In the fuel cell system 100 of the above embodiment, the open-close sensor 124 serves to detect the open/closed position of the cover portion 122. The invention is, however, not limited to this configuration. For example, like the fuel cell system 100b shown in FIG. 4, the open-close detection switch 126 may be provided to switch the detection between the open position and the closed position by pressing force from the cover portion 122. According to this modification, both the open-close sensor 124 and the open-close detection switch 126 may serve to detect the open/closed position of the cover portion 122. In this modification, the controller 170 may determine that the cover portion 122 is in the open position when the open/closed position of the cover portion 122 detected by at least one of the open-close sensor 124 and the open-close detection switch 126 indicates the open position.

In the fuel cell system 100 of the above embodiment, the open-close sensor 124 outputs the signal representing the open position to the controller 170 in response to detection of the open position of the cover portion 122, while outputting the signal representing the closed position to the controller 170 in response to detection of the closed position of the cover portion 122. The invention is, however, not limited to this configuration. According to one modification, the open-close sensor 124 may be configured to output only a signal representing the open position to the controller 170 in response to detection of the open position of the cover portion 122. In this modification, when the open-close sensor 124 does not output the signal representing the open position to the controller 170, the controller 170 presumes that the open-close sensor 124 detects the closed position. According to another modification, the open-close sensor 124 may be configured to output only a signal representing the closed position to the controller 170 in response to detection of the closed position of the cover portion 122. In this modification, when the open-close sensor 124 does not output the signal representing the closed position to the controller 170, the controller 170 presumes that the open-close sensor 124 detects the open position. In general, the controller 170 should determine the open/closed position of the cover portion 122 detected by the open-close sensor 124, based on the signal that is output from the open-close sensor 124 and represents the open/closed position of the cover portion 122.

In the fuel cell system 100 of the above embodiment, the recorder 172 does not record the state that the accelerator operation for accelerating the vehicle 10 is accelerator-off operation and that the vehicle 10 moves only at a speed of not higher than 3 km/h for a time period of less than 3 seconds since activation of the fuel cell system 100, as the travel history. The invention is, however, not limited to this configuration. According to a modification, the recorder 172 may not record the state that the accelerator operation for accelerating the vehicle 10 is accelerator-off operation and that the vehicle 10 moves only at a speed of not higher than 6 km/h for a time period of less than 1.5 seconds since activation of the fuel cell system 100, as the travel history. According to another modification, the recorder 172 may not record the state that the accelerator operation for accelerating the vehicle 10 is accelerator-off operation and that the vehicle 10 moves only at a speed of not higher than 1.5 km/h for a time period of less than 6 seconds since activation of the fuel cell system 100, as the travel history. In general, the recorder 172 should not record the state that the accelerator operation for accelerating the vehicle 10 is accelerator-off operation and that the vehicle 10 moves by only less than a predetermined distance since activation of the fuel cell system 100, as the travel history.

In the fuel cell system 100 of the above embodiment, in the case where the vehicle 10 is in the drivable state, where the recorder 172 has no travel history since activation of the fuel cell system 100 and where the open/closed position of the cover portion 122 detected by the open-close sensor 124 indicates the open position, the controller 170 immediately sets the vehicle 10 to the non-drivable state. The invention is, however, not limited to this configuration. According to a modification, in the case where the vehicle 10 is in the drivable state, where the recorder 172 has no travel history since activation of the fuel cell system 100 and where the open/closed position of the cover portion 122 detected by the open-close sensor 124 indicates the open position, the controller 170 may notify the driver of the vehicle 10 of this state and subsequently set the vehicle 10 to the non-drivable state. In other words, in the case where the vehicle 10 is in the drivable state, where the recorder 172 has no travel history since activation of the fuel cell system 100 and where the open/closed position of the cover portion 122 detected by the open-close sensor 124 indicates the open position, the controller 17 may perform or may not perform a specified process prior to setting the vehicle 10 to the non-drivable state.

In the fuel cell system 100 of the above embodiment, in the drive stop process of FIG. 2, the controller 170 determines whether the recorder 172 has no travel history since activation of the fuel cell system 100, prior to the determination of whether the open/closed position of the cover portion 122 detected by the open-close sensor 124 indicates the open position. The invention is, however, not limited to this configuration. According to a modification, in the drive stop process of FIG. 2, the controller 170 may determine whether the open/closed position of the cover portion 122 detected by the open-close sensor 124 indicates the open position, prior to the determination of whether the recorder 172 has no travel history since activation of the fuel cell system 100.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A fuel cell system mounted on a vehicle, comprising:
a tank that stores a reactive gas which is to be supplied to a fuel cell;
a filling port that fills the reactive gas into the tank and is connected with a supply tube that supplies the reactive gas;
a lid that closes the filling port;
an open-close sensor that detects open/closed position of the lid;
a recorder unit that records a travel history which indicates the fact that the vehicle moves; and
a controller unit that controls the vehicle, wherein
upon satisfaction of conditions that the vehicle is in a drivable state, that the recorder has no travel history since activation of the fuel cell system and that the open/closed position of the cover portion detected by the open-close sensor indicates an open position, the controller sets the vehicle to a non-drivable state.

2. The fuel cell system according to claim 1,
wherein a state that an accelerator operation for accelerating the vehicle is accelerator-off operation and that the vehicle moves only at a speed of not higher than a predetermined speed for a time period of not longer than a predetermined time since activation of the fuel cell system is specified as a state that the recorder has no travel history.

3. The fuel cell system according to claim 1, further comprising
a notification unit that notifies a driver of the vehicle of the lid being in the open position when setting the vehicle to the non-drivable state upon satisfaction of the conditions.

\* \* \* \* \*